(12) United States Patent
Merchant

(10) Patent No.: US 12,230,050 B2
(45) Date of Patent: *Feb. 18, 2025

(54) USING ARTIFICIAL INTELLIGENCE TO ANALYZE SENSOR DATA TO DETECT POTENTIAL CHANGE(S) FOR RISK AND THREAT ASSESSMENT AND IDENTIFICATION

(71) Applicant: Amizen Labs, LLC, Great Neck, NY (US)

(72) Inventor: Shajahan Merchant, Great Neck, NY (US)

(73) Assignee: Amizen Labs, LLC, Great Neck, NY (US)

( * ) Notice: Subject to any disclaimer, the term of this patent is extended or adjusted under 35 U.S.C. 154(b) by 241 days.

This patent is subject to a terminal disclaimer.

(21) Appl. No.: 17/745,486

(22) Filed: May 16, 2022

(65) Prior Publication Data
US 2023/0186670 A1    Jun. 15, 2023

Related U.S. Application Data

(63) Continuation-in-part of application No. 17/488,262, filed on Sep. 28, 2021, now Pat. No. 11,335,126.

(51) Int. Cl.
*G06V 40/10* (2022.01)
(52) U.S. Cl.
CPC .................................. *G06V 40/103* (2022.01)
(58) Field of Classification Search
CPC .... G06V 40/103; G06V 40/175; G06V 40/20; G06V 20/52; G06V 10/454; G06V 10/54; G06V 10/774; G06V 10/82; G06V 30/18057; G06V 40/10; G06V 40/80; G06V 20/44; G06V 20/46; G06V 2001/05; G08B 13/19613; G08B 13/19671; G08B 13/22; G08B 21/182; G08B 23/00; G08B 3/00; G08B 5/00; G08B 6/00; G08B 13/19606; G08B 13/19608; G08B 13/19645;
(Continued)

(56) References Cited
U.S. PATENT DOCUMENTS 10,096,235 B2 * 10/2018 Cobb .................... G08B 29/185
10,146,322 B2 * 12/2018 Burr ...................... G06F 3/0304
(Continued)

FOREIGN PATENT DOCUMENTS

WO    WO-2010111748 A1 * 10/2010 ......... G06K 9/00771

*Primary Examiner* — Jose L Couso
(74) *Attorney, Agent, or Firm* — Shiv S. Naimpally; Flagship Patents

(57) ABSTRACT

In some aspects, a server receives a video stream from a security system and processes a frame from the video stream to create a processed frame. The server analyzes the processed frame using artificial intelligence and determines that the processed frame includes a change to a surface area of an object and determines details associated with the change. The server determines that the change satisfies one or more thresholds, such as a change threshold and a time threshold. The server adds annotations to the processed frame to create an annotated frame. The annotations include the change and at least a portion of the details associated with the change to the surface area of the object. The server sends, to a designated recipient, a notification that includes a link to view the annotated frame.

20 Claims, 8 Drawing Sheets

(58) Field of Classification Search
CPC .. G08B 29/186; G06N 3/02; G06N 3/08–088;
G06N 3/0445; G06N 3/0454; G06N
3/4046; G06N 7/00; G06N 7/01; G06N
20/00; G06T 3/4046; G06T 5/60; G06T
9/002; G06T 2207/20076; G06T
2207/20081; G06T 2207/20084; G06T
7/20; G06T 2207/10004; G06T
2207/10008; G06T 2207/10012; G06T
2207/10016; G06T 2207/10021; G06K
7/1482; G06F 18/214; G06F 18/22; G06F
18/241; G06F 18/2415; Y10S 128/925;
H04N 7/18; H04N 7/181; H04N 7/183;
H04N 7/185; H04N 7/186; H04N 7/188;
H04N 7/141; G06Q 50/265; H04L
63/0209; H04L 63/30; H04L 63/302
See application file for complete search history.

(56) References Cited

U.S. PATENT DOCUMENTS

| | | | |
|---|---|---|---|
| 10,891,469 B2* | 1/2021 | Agarwal | G07G 1/0063 |
| 2016/0188980 A1* | 6/2016 | Martin | G11B 27/005 |
| | | | 382/103 |
| 2016/0232774 A1* | 8/2016 | Noland | G08B 25/10 |
| 2018/0184239 A1* | 6/2018 | Bestor | G06V 20/52 |
| 2018/0357247 A1* | 12/2018 | Siminoff | G08B 13/19606 |
| 2019/0089934 A1* | 3/2019 | Goulden | G08B 7/06 |
| 2021/0020022 A1* | 1/2021 | Hutz | G06V 20/52 |
| 2021/0029330 A1* | 1/2021 | Khadloya | G10L 25/51 |
| 2021/0248822 A1* | 8/2021 | Choi | G02B 27/017 |
| 2021/0366072 A1* | 11/2021 | Millar | G06F 9/451 |
| 2021/0397848 A1* | 12/2021 | Lee | G06V 20/52 |

* cited by examiner

USING ARTIFICIAL INTELLIGENCE TO ANALYZE SENSOR DATA TO DETECT POTENTIAL CHANGE(S) FOR RISK AND THREAT ASSESSMENT AND IDENTIFICATION

CROSS-REFERENCE TO RELATED APPLICATIONS

The present patent application is a continuation-in-part of U.S. patent application Ser. No. 17/488,262, filed on Sep. 28, 2021, entitled "USING ARTIFICIAL INTELLIGENCE TO ANALYZE OUTPUT FROM A SECURITY SYSTEM TO DETECT A POTENTIAL CRIME IN PROGRESS" and is incorporated by reference herein in its entirety and for all purposes as if completely and fully set forth herein.

FIELD OF THE INVENTION

This invention relates to a system that uses artificial intelligence to analyze sensor data (e.g., images, audio data, and the like) to detect a potential threat, risk, crime, or a potential change to an object, including a change to state of the object, or a posture of a human being. If a change threshold is satisfied, the system may perform one or more actions, including, for example, notifying designated recipient(s).

DESCRIPTION OF THE RELATED ART

Various locations (e.g., locations inside a building and locations outside the building), such as a place of worship, a statue, and the like may be subject to damage by vandals. For example, the damage may include graffiti, defacement, or the like. Often, by the time the authorities (the police, an owner, a manager, a security company, or the like) have been notified, the vandal(s) have left the scene, making it difficult to find and apprehend the perpetrators.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some aspects, a server receives a video stream from a system and processes a frame from the video stream to create a processed frame. The server analyzes the processed frame using artificial intelligence and determines that the processed frame includes a change to a state of an object and determines details associated with the change. The server determines that the change satisfies one or more thresholds, such as a change threshold and a time threshold. The server adds annotations to the processed frame to create an annotated frame. The annotations include the change and at least a portion of the details associated with the change to the state of the object. The server sends, to a designated recipient, a notification that includes a link to view the annotated frame.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
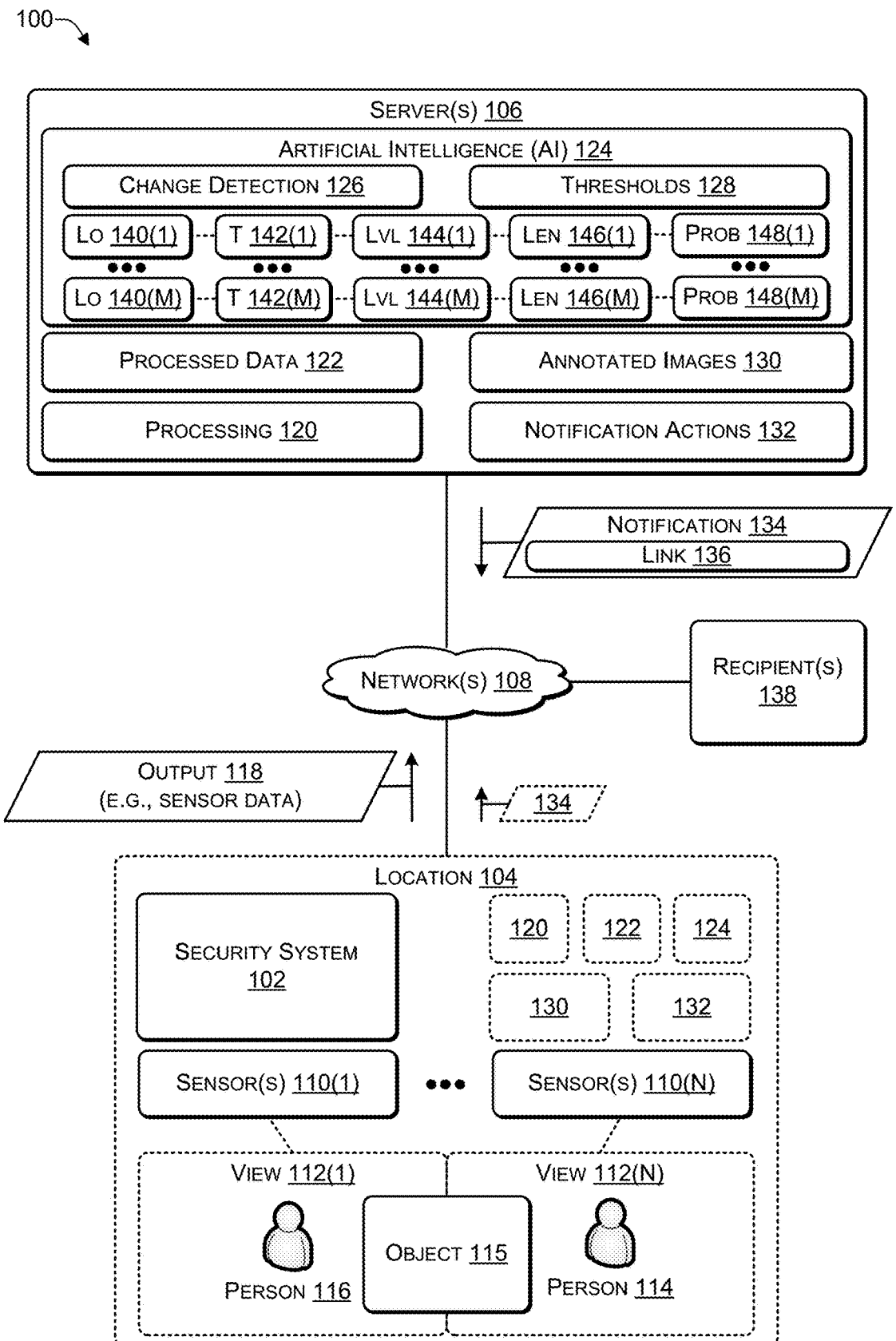
FIG. 1 is a block diagram of a system that includes an artificial intelligence (AI) to analyze the output of a security system, according to some embodiments.

The systems and techniques described herein monitor the output, e.g., the sensor data (e.g., video and/or audio data) of a security system and use artificial intelligence (AI) to analyze the sensor data to identify changes, determine whether the changes satisfy one or more thresholds, and if the changes satisfy the one or more thresholds, provide a notification to one or more recipients. The notification may include a link that enables the recipient(s) to view at least a portion of the video, listen to a portion of the audio data, or both. For example, in some cases, the notification may be sent to an owner of a business or to a security company monitoring the video stream and the owner or an employee of the security company may view at least a portion of the video stream, listen to the audio data, or both and determine whether to notify the police. In other cases, the notification may be sent directly to the police and the police may view the portion of the video stream, listen to the audio data, or both and determine whether to send police officers to the business, e.g., to apprehend those involved.

The video stream and/or audio data may be provided by one or more sensors (e.g., image sensors, microphones, and the like). The image sensors may have a field of view of one or more objects (defined herein as anything having a surface area), one or more people, or any combination thereof. The sensors of the security system may include microphones to provide audio data for analysis by the AI. The field of view may include (1) a portion of an interior surface of a building, a vehicle, or another interior object, (2) at least a portion of exterior surface(s) of an object, such as a building, (3) immovable objects (e.g., statue or the like), (4) movable objects, (5) one or more human beings, or any combination thereof. For exterior objects, the AI may be trained to recognize and ignore weather-related effects, such as snow, sleet, hail, rain, and the like, while flagging other changes for human review. For example, a truck splashing water on the exterior surface of a building, a person spilling a drink on an interior wall of a building, a bird defecating on a statue, or the like may cause the AI to detect and send a notification of the change to a human for review. In some cases, the AI may use a neural network algorithm, such as a convolutional neural network algorithm.

The artificial intelligence may perform change detection to one or more objects using several different techniques. An object is anything with a surface area. An object may include other objects. For example, a statue may include both the statute and a display case, pedestal, or the like. The artificial intelligence may identify a change to an object, such as something (e.g., graffiti) that has been added to an object (e.g., exterior of a building, statue, interior of a building or vehicle, or the like). As another example, the artificial intelligence may identify a change to an object, such as defacement of an object (e.g., removal of a portion of the object).

In some cases, the output of the security system may be modified prior to being analyzed by the artificial intelligence. For example, an image from one of the video streams may be modified by changing the size, changing the dimensions, changing the sharpness, changing the zoom, changing the brightness, changing the contrast, changing the saturation, other modifications, or any combination thereof to enable and increase an accuracy of computer vision change detection using the artificial intelligence. Audio data from microphones may be filtered to emphasize human voice frequencies and automatic speech recognition performed to determine whether the speech includes threatening words or phrases. In some cases, one large image may be split into two or more smaller images. For example, a static object, such as a statue, may be distinguished from moving objects, such as people, animals, and the like.

After identifying one or more changes in the images, the artificial intelligence may determine whether the changes are sufficient to satisfy a particular threshold. For example, if a person temporarily stands in front of an immovable object (e.g., exterior wall, statue, or the like), then the artificial intelligence may determine that no change is present because the threshold was not satisfied. As another example, if a person spray paints graffiti or defaces an immovable object (e.g., exterior wall, statue, or the like), then the artificial intelligence may determine that the threshold is satisfied (e.g., change to the object persist for more than a predetermined amount of time). If the threshold(s) are satisfied, one or more designated recipients (e.g., an owner, a manager, a security company employee, a police station, a website, a social media posting, or the like) may be provided a notification.

As a first example, a server includes one or more processors and one or more non-transitory computer-readable storage media to store instructions executable by the one or more processors to perform various operations. The operations include receiving a video stream comprising a plurality of frames from a security system. The operations include processing a frame from the plurality of frames to create a processed frame. For example, processing the frame from the plurality of frames to create the processed frame may include: adjusting a frame size of the frame, adjusting a sharpness of the frame, adjusting a zoom of the frame, adjusting a brightness of the frame, adjusting a contrast of the frame, adjusting a color saturation of the frame, adjusting one or more colors of the frame, converting the one or more colors of the frame to a grayscale, converting the frame into two or more portions of the frame, adjusting the resolution of the frame, stitching one or more frames into a single frame or any combination thereof. The operations include performing an analysis of the processed frame using an artificial intelligence module executed by the one or more processors. For example, the artificial intelligence module uses a deep learning neural network. The operations include determining, based on the analysis, that the processed frame includes a change to a state of an object. For example, the change to the state of the object may include a change in: a presence or absence of the object, an orientation of the object, a position of the object, a color of the object, a location of the object, a material of the object, a texture of the object, a shape of the object, a light on the object, a reflection of the object, a size of the object, a visibility of the object, a surface area of the object, or any combination thereof. Determining, based on the analysis, that the processed frame includes the change to the state of the object may include determining that a substance is present on at least a portion of the object. Determining, based on the analysis, that the processed frame includes the change to the surface area of the object may include determining that at least a portion of the object includes defacement. For example, the defacement may include (1) scratching at least the portion of the object, (2) removing at least the portion of the object from the object, or (3) both. The operations include determining, based on the analysis, details associated with the change to the state of the object. The operations include determining, based on the details associated with the change to the state of the object, that a particular threshold of a plurality of thresholds has been satisfied. For example, the particular threshold may include (1) a particular type of change and (2) a length of time that the particular type of change is present. The operations include annotating the processed frame to create an annotated frame that includes the change and at least a portion of the details associated with the change to the state of the object. The operations include sending a notification to a designated recipient, the notification including a link to view the annotated frame.

As a second example, a server includes one or more processors and one or more non-transitory computer-readable storage media to store instructions executable by the one or more processors to perform various operations. The operations include receiving a video stream from a security system. The operations include processing a frame from the video stream to create a processed frame. For example, processing the frame to create the processed frame may include: adjusting a frame size of the frame, adjusting a sharpness of the frame, adjusting a zoom of the frame, adjusting a brightness of the frame, adjusting a contrast of the frame, adjusting a color saturation of the frame, adjusting one or more colors of the frame, adjusting the resolution of the frame, stitching one or more frames into a single frame converting the one or more colors of the frame to a grayscale, converting the frame into two or more portions of the frame, or any combination thereof. The operations include performing an analysis of the processed frame using an artificial intelligence module. In some cases, the artificial intelligence module may use a deep learning neural network. For example, the analysis may identify in the processed frame at least one of: a posture of a person, a gesture performed by the person, a facial expression of the person, a weapon, or a state of an object. To illustrate, the gesture may include: a first gesture that indicates a presence of a threat or a second gesture performed near a particular sign. As another illustration, the posture associated with the person includes: holding both arms up, holding both hands behind the person's head, holding both hands behind the person's back, crouching, lying down, push, fist fight, kick, punch, slap, hackling, shoving, hands over a person's face, hands over another person's body, hands tied, legs tied, hiding behind an object, crouching behind an object, a presence of the person in an area that the person is not authorized to be present in, bent over, shaking, trembling, standing, seating, walking, running, snatching, an injured posture, or any combination thereof. As a further illustration, the facial expression may indicate: fear, surprise, anger, aggression, pain, hurt, distress, aggravation, or being bullied, or any combination thereof. The operations include determining, based on the analysis, that the processed frame includes one or more threats. The operations include determining, based on the analysis, details associated with individual threats of the one or more threats. For example, the details associated with individual threats may include: a locus comprising one of the person, or the object, a threat type, a threat level determined based at least in part on the facial expression of the person, a threatening gesture, or the weapon in the processed frame, a length of time individual threats have been detected, a consecutive number of frames that individual threats have been detected, a probability associated with the threat type, or any combination thereof. The operations include determining, based on the details associated with the one or more threats, that a particular threat threshold of a plurality of threat thresholds has been satisfied. For example, the particular threat threshold may include (1) a particular type of threat and (2) a length of time that the particular type of threat is present. The operations include annotating the frame to create an annotated frame that includes the one or more threats and at least a portion of the details associated with individual threats of the one or more threats. The operations include sending a notification to a designated recipient. The notification includes a link to view the annotated frame.

As a third example, a server may include one or more processors and one or more non-transitory computer-readable storage media to store instructions executable by the one or more processors to perform various operations. The operations include receiving audio data (e.g., a type of sensor data) from one or more microphones (e.g., a type of sensor) of a security system. The operations include processing the audio data to create processed audio. For example, processing the audio data to create the processed audio may include filtering the audio data to (1) include a frequency range associated with a human voice (2) exclude higher frequencies above the frequency range associated with the human voice, and (3) exclude lower frequencies below the frequency range associated with the human voice. The operations include performing an analysis of the processed audio using an artificial intelligence module. The analysis may identify, in the processed audio, at least one of: a sound, a word, or a phrase. For example, the sound may include an indication of pain. As another example, the word or phrase may indicate an argument, indicate cursing, indicates pleading, indicate an injury, indicate a threat, indicate bullying, indicate pain, indicate fear, includes a racial slur, or any combination thereof. As a further example, the word or phrase may have (1) a volume level greater than a first decibel threshold, indicating shouting or (2) a volume level less than a second decibel threshold, indicating whispering. The operations include determining, based on the analysis, that the processed audio includes one or more threats. The operations include determining, based on the one or more threats, that a particular threat threshold of a plurality of threat thresholds has been satisfied. For example, the processed audio may include a pitch of a voice changing from a first frequency to a second frequency where the pitch of the voice changing from the first frequency to the second frequency satisfies the particular threat threshold. The operations include sending a notification to a designated recipient. The notification includes a link to listen to the audio data or the processed audio.

FIG. 1 is a block diagram of a system 100 that includes an artificial intelligence (AI) to analyze the output of a security system, according to some embodiments. In the system 100, a security system 102 is located at a location 104 to monitor an object, such as an interior of an object (e.g., vehicle) or an exterior of an object (e.g., building, a statue, an artifact, or another relatively unchanging object). The security system 102 may include one or more devices that include sensors capable of capturing, displaying, and/or transmitting a set of (e.g., one or more) images, including a screen capture. In some cases, the sensors may be capable of capable of capturing, displaying, and/or transmitting audio data.

The security system 102 may be connected to a server 106 via one or more networks 108. At least a portion of the servers 106 may, in some cases, be cloud-based. For ease of understanding, various software modules and data are illustrated as being located at the location 104 or at the server 106. However, it should be understood that the various software modules and data described herein may be distributed between the security system 102 (or a computing device at the location 104) and the servers 106. For example, one or more of the software modules and data illustrated as being hosted by the server 106 may be hosted by the security system 102 (or a computing device at the location 104). In addition, in some cases, one or more of the functions described herein may be incorporated into a single board, embedded device, integrated circuit (e.g., a system-on-a-chip) or the like.

The security system 102 may be connected (e.g., wirelessly, wired, or a combination of both) to multiple sensors, such as a sensor 110(1) to a sensor 110(N) (N>0). For example, the sensors 110 may include one or more imaging devices (e.g., cameras) and other types of sensors such as microphones, motion detectors, and the like. In addition to capturing visible light, the sensors 110 may be capable of capturing other types of light (e.g., electromagnetic radiation) that are not visible to the human eye, such as infrared, ultraviolet, thermal imaging, and the like. Each of the sensors 110 may have a particular view (e.g., field of view). For example, the sensor 110(1) may have a view 112(1) and the sensor 110(N) may have a view 112(N). Each of the views 110 may be different from others of the views 110. For example, the view 112(1) may be different from the view 112(N). In some cases, a portion of one view may overlap with a portion of another view. Each of the views 112 may include the state of one or more objects present in the location 104, such as a representative object 115. In some cases, in a retail business, one or more of the views 112 may include at least a portion of a person 114 (e.g., a first person) and at least of the object 115. In some cases, one or more of the views 112 may include a person 116 (e.g., a second person).

In some cases, an output 118 (e.g., sensor data, such as one or more video streams, audio data streams, or the like from the sensors 110) of the security system 102 may be sent to one or more servers 106. For example, a place of worship (e.g., a church, a temple, a mosque, or the like), a government (e.g., city, county, state, federal) entity, a business, or another type of entity may have a subscription to a monitoring service (e.g., hosted by the servers 106) that monitors the output 118 of the security system 102 to determine when a change is detected and perform one or more actions in response to detecting a change. Each video stream may include a sequence of images captured at a particular rate, such as, for example, 15, 30, 60 frames per second (FPS). Each image may include a timestamp or may include a timecode identifying a particular time when the image was captured. For example, the timestamp or timecode may include a date (e.g., year, month, day) and hours, minutes, seconds, and milliseconds. The output 118 may include digital audio data recorded by the sensors 110 at a particular sampling frequency.

The server 106 may include a processing module 120 that processes the sensor data in the output 118 to create processed data 122 (e.g., processed images, processed audio, or the like). The output 118 may be processed in such a way as to enable changes (e.g., graffiti, defacement, or the like) to be more easily detected by an artificial intelligence (AI) module 124. Thus, the processed data 122 may be processed to be machine-readable (e.g., rather than human-readable) by the AI module 124. The AI 124 may perform an analysis of the processed data 122 including performing change detection 126 and creating annotated images 130 in which the detected changes are identified (examples of annotated images are provided herein). The processing 120 may receive the images in the output 118 or retrieve the images from a storage location, such as a buffer, or other type of storage. The buffer may enable the AI module 124 to process the output 118 substantially in real-time, e.g., with a relatively small amount of latency (e.g., less than 1 second) without losing any portion of the output 118.

The AI 124 may determine various details associated with one or more changes (e.g., 1 to M, M>0), such as a locus 140 of each change, a type 142 of each change, a change level 144 of each change, a length 146 of each change, and a probability 148. The locus 140 may indicate what the change is associated with, e.g., the object 115 in the location 104. The type 142 may indicate the type of change identified, e.g., graffiti, defacement, or the like. The change level 144 may indicate a level associated with a change. For example, the change level 144 may indicate how large the changed area is relative to the overall area of the object 115. To illustrate, the larger the amount of change relative to the overall area of the object 115, the greater the change level 144. For example, a large amount of graffiti or defacement may have a higher change level 144 than a smaller amount of graffiti or defacement. The length 146 may indicate a length of time that a change has been identified. For example, the length 146 may include a number of images in which the change has been identified, a duration (e.g., the last time at which the change was identified minus the first time at which the change was identified), or both. For example, the AI 124 determine a change is present when the change is detected consecutively in at least a pre-determined number of images (e.g., at least 9,000 images at 30 fps=5 minutes) or for at least a predetermined amount of time (e.g., at least 300 seconds=5 minutes). The probability 148 may be associated with the type 142 of change, e.g., 98% probability that a permanent change (e.g., to a surface area of a building, statue, artifact, interior of a vehicle, or the like) occurred. The change that is detected by the AI 124 may include an item (e.g., an enclosure that includes a bomb or another type of device) placed near the object 115.

If the number and/or type of changes detected by the change detection 126 satisfies one or more thresholds 128, then the server 106 may perform one or more notification actions 132. For example, the thresholds 128 may be based on the locus 140, the type of change 142, the level of change 144, the length of the change 146, the probability 148, another factor, or any combination thereof. To illustrate, if a first change (e.g., graffiti to a building) and a second change (e.g., defacement of a statue or an artifact) are both present, then one of the thresholds 128 may be satisfied.

One of the notification actions 132 may include sending a notification 134 that includes a link 136 to one or more recipients 138 specified in the notification actions 132. The link 136 may enable the recipients 138 to view and/or listen to at least a portion of the output 118, the processed data 122, the annotated images 130, or any combination thereof. The recipients 138 may include law enforcement, such as police. The recipients 138 may include an owner (or manager) of the object 115 at the location 104, a security company that monitors various locations including the location 104, or other responsible individual. In response to receiving the notification 134, the recipients 138 may view at least a portion of the output 118, the processed data 122, the annotated images 130, or any combination thereof and determine whether to notify law enforcement (e.g., police). For example, in some areas, creating a false alarm by calling law enforcement when no crime is present may result in a fine being levied to a business. To avoid such situations, the recipients 138 may include the owner (or manager) or a security company to enable a human to view what is happening at the location 104 prior to notifying law enforcement. The notification 134 may take the form of a text message, an automated voice message, a posting to a social media site, posting to website, another type of notification message, or any combination thereof. The notification actions 132 may include sounding an alarm at the location 104 or at a remote location, such as at a security company monitoring the location 104 or at the home of an owner of manager of the object 115 at the location 104.

The notification actions 132 may include sounding an alarm (e.g., at the location 104, at a security company that is monitoring the location 104, at the home of the owner of the business, or any combination thereof), playing an audio file at the location 104 (e.g., "Authorities have been alerted"), sending a message (e.g., text or voice message), a social media posting, website posting, sharing an image stream or a link to a live stream (e.g., the output 118, the annotated images 130, or both). The message, call, or social media post may include one or more of: a name of the location 104, an address or other type of coordinates associated with the location 104, the link 136 to a secure website that shows one or more images of the annotated images 130, the output 118, or both, instructions on how to access the secure website, other information, or any combination thereof. The streaming (e.g., the output 118, the processed data 122, the annotated images 130, or the like) may be accessed via a password or via a unique universal resource locator (URL). The site where the streaming is available may enable a viewer to share the streaming with others (e.g., owner of business or security company may share with authorities, such as law enforcement).

The AI 124 may include one or more deep learning neural networks (e.g., convolution neural network) and may be trained using supervised learning, unsupervised learning, reinforcement learning, self-learning, or any combination thereof. The AI 124 may analyze an emotion conveyed by a facial expression of the person 114, the person 116, or both. For example, the AI 124 may take into account how long the person 114 has a particular expression, such as a shocked expression, a fearful expression, crying (e.g., one or more tears present), a distracted expression, blinks frequently or in a particular pattern (e.g., 3 short blinks followed by 3 long blinks followed by 3 short blinks, alternating long and short blinks, or the like).

In this way, the output 118 of the security system 102 may be analyzed using the AI 124 to determine whether one or more changes are present. If the AI 124 detects one or more changes and the changes satisfy the thresholds 128, then the server 106 may perform the one or more notification actions 132 by, for example, sending the notification 134 including the link 136 to one or more recipients 138 specified in the notification actions 132.

While the processing 120, the AI 124, the annotated images 130, and the notification actions 132 are shown as being performed on the server 106, in some cases, one or more of these functions may be performed at the location 104. Thus, it should be understood that the functionality described herein may be divided in any number of ways between the location 104 and the server 106. For example, the processing 120 may be performed at the location 104 and the processed images 122 may be sent as the output 118 to the server 106. As another example, the processing 120, the AI 124, or both may be performed at the location 104 and the notification 134 may be sent by the security system 102 (or by a computing device at the location 104) rather than the server 106. In some cases, one or more of the functions described herein may be incorporated into an embedded controller, integrated circuit, system-on-a-chip (SOC), or the like.

While a single representative location 104 is shown in FIG. 1 for ease of understanding, it should be understood that the server 106 may receive multiple outputs from multiple security systems in multiple locations. Thus, the server 106 may monitor multiple locations substantially simultaneously. For example, in some cases, the server 106 may be associated with a security company that is monitoring multiple locations. The server 106 may send the notification 134 to an employee of the security company when one or more changes have been detected and the one or more changes satisfy at least one of the thresholds 128.

Thus, a system may receive (or retrieve) multiple data streams from multiple sensors (e.g., video, audio, and the like) or as screenshot of one or multiple display devices. A processing module may process the data (e.g., video data, audio data) to create processed data. The AI module may analyze individual images of the processed images to determine whether one or more changes are present. If the AI detects one or more changes, the AI may determine whether the number of changes, a length of time for which each change has been present, or other change-related characteristics satisfy one or more thresholds. If the thresholds are satisfied, then a notification may be automatically (e.g., without human interaction) sent to one or more recipients, such as law enforcement, a business owner or manager, a security company, another recipient, or any combination thereof.

An object is anything that has surface area. The AI determines a change in the state of the object to determine a risk and/or threat. Some examples of objects include, but are not limited to: a drawer, a safe, a door, a window, one or more shelves, a physical shopping cart, a hand basket, one or more products, a wall, a floor, a sculpture or other type of art object, a statue, a pedestal, art work, a vehicle, a bag, or a backpack. An object may include one or more additional objects. For example, an object such as a showcase or a shelf may include additional objects, such as art works, jewelry or the like. As another example, an object, such as a pedestal may include an additional object, such as a sculpture.

Any perceived or actual physical change to the object may be referred to as a "Change in State of an Object". The AI is used to monitor one or more objects to detect a change in the state of each object of the one or more objects, as shown in Table 1 below.

TABLE 1

| Change in State of Object | Example(s) |
| --- | --- |
| Presence of an object | If a bag (or any other object) was detected in restricted area. |
| Position or Orientation of the whole or part of the monitored object(s) changed | An artwork on the wall has tilted hence its position has changed from its normal state. A statue that used to face the camera has now shifted its orientation or position. A piece of Jewelry moved from its position. |
| Location of the whole or part of the monitored object(s) changed | A filled shopping cart (object) was detected going out (direction) of the entrance door (location). A statue was on pedestal but now is on the ground. Cellphone inside the Safe was removed. A person sneaked the Jewelry item from shelf into their bag (located changed). A filled hand basket (Object) in supermarket is not supposed to go out through entrance door (at undesired location). A vehicle detected moving towards a crowd (location of the vehicle at a undesired location). Flash Mob picks up valuables from the shelf and run (location of the valuable moved) |
| Texture of the whole or part of the monitored object(s) changed | When an interior or external wall is vandalized with the paint it will change the texture of the wall. When someone tries to use flame burner to break into a safe it will change the texture of the safe. When someone tries to break a wall it will change the texture of the wall. A glass showcase was broken and now its texture is different |
| Material of the whole or part of the monitored object(s) changed | A thief replaces silver jewelry with aluminum jewelry. The canvas of the art work changed to cheap paper replica. |
| Physical form of the whole or part of the monitored object(s) changed | A wall (object) was vandalized or a statue (object) was vandalized with paint, the physical form of the object has changed. The wall used to be a brick wall but now it has graffiti. The statue was white marble statue but due to vandalization it now has marks or symbols. |
| Shape of the whole or of the monitored object(s) changed | The statue (object) was broken (change in shape) and now the shape of the statue is different then its normal state. |
| Color of the whole or part of the monitored object(s) changed | The floor (object) color has changed (Partial area) with blood stain (different color). An object was vandalized using color. |

TABLE 1-continued

| Change in State of Object | Example(s) |
|---|---|
| Open or Close or Empty or Filled. Partially or Whole. | A safe door open or partially open; A cash register empty or partially empty. A safe empty or partially empty. A showcase empty or partially empty. A shelf with valuables empty or partially empty. Door to the safe room left partially open. |
| Physical Environment changed such as smoke, fire, environment lighting | A thief is tampering the safe with flame burner, the model can detect smoke or fire (change in physical environment); Lighting in a certain area of the showroom blows off or turns off (change in lighting in the physical environment) |
| Change to an object in any manner | All physical changes or perceived physical changes. All physical or perceived change to the state of the object |

The length of time for which a change is present may include for example, a duration in an amount of time (e.g., milliseconds, seconds, minutes, or the like), the number of video frames in which the change is present, or the like.

Detecting a change that includes a threat may include determining a posture, determining a behavior, determining a facial expression or any combination thereof. Examples, include, but are not limited to: Push (A person pushing another person e.g. on subway rail tracks), Fist fight (One or more person Fist fighting), Kick (One or more person kicking), Punch (One or more person punching another person or persons), Slap (One or more person slapping another person or persons), Hackling (One or more person hacking another person or persons), Shoving (One or more person shoving an object or thing), Hands behind the head (A person putting their hands behind the head), Hands over face (A person hiding their face), Hands tied (A person whose hands are tied), Legs tied (A person whole legs are tied), Hiding or crouching behind an object (A person partially or fully hiding behind an object), Walking (A person walking or present in a location they should not be), Standing (A person standing or present in a location they should not be), Sitting (A person sitting or present in a location they should not be), Bent (A person bent), Lying on the floor (A person lying on the floor), Shaking or Trembling (A person shaking or trembling), Running (A person running away), Snatching (A person snatching an object), Bleeding (A person bleeding), Crying (A person crying), Pain (A person in pain), Hurt (A person is hurt), Distress (A person in distress), Aggravation (A person demonstrating aggravation), Bullying (A person bullying another person), Chaos.

A weapon is defined as anything perceived as capable of being used to hurt a human being. The AI is used to detect the presence of a weapon, such as, for example, any type of sharp object that can be used to hurt others, any type of heavy object that can be used to hurt others, any type of gun (e.g., hand gun, rifle, semi-automatic, automatic etc.), any type of knife, any type of baseball bat or cricket bat or rod or such things, any type of a blade, any type of a stick, or any type of light saber.

When the sensors include microphones, the audio data may be processed and the AI used to analyze the processed data. Argument (One or more person is arguing), Threatening (one or more person is threatening), Quarrelling (one or more person are quarrelling), Aggravation (one or more person are aggravating others), Bullying (one or more person are bullying), Whispering (one or more person are whispering), Yelling (one or more person are yelling), Shouting (one or more person are shouting), Cursing (one or more person are saying curse words), Racial slurs, Pain related sound by person, Pain related words by person (person saying "aaah" or another type of sound), Pleading related sound tone by person (Fearful and distress type sound tone), Pleading related words by person (person saying "please don't do this", "please stop", "help"), State of situation (person saying "I have been shot", "There is debris all over", "I have been stabbed", "A person has been stabbed", "A person is injured"), a combination of (1) a word (e.g., name calling), (2) a pitch of a voice (e.g., higher than normal), and (3) volume of voice (higher than normal (yelling) or lower than normal (whispering)). For audio, the processing 120 may use multiple frequency bands to identify the frequencies associated with the speech in the output 118 and create a filter to filter out non-speech frequencies. For example, a male voice typically occupies the frequencies 85 to 180 Hertz (Hz) while a female voice typically occupies the frequencies 165 to 255 Hz. The processing 120 may use at least 3 bands, e.g., (1) below 85 Hz, (2A) 85 Hz-170 Hz, (2B) 171 Hz-255 Hz, and (3) above 255 Hz. The processing 120 may analyze a first portion (e.g., less than a few seconds) of the audio data in the output 118 and determine the frequencies that the speech in the output 118 occupy. Based on this, the processing 120 may subsequently divide the audio data in the output 120 into three bands. For example, if the analysis of the output 120 indicates speech content between approximately 85 Hz-180 Hz, the processing 120 may create three bands, e.g., (1) below 85 Hz, (2) between 85 Hz-180 Hz, and (3) above 180 Hz. The processing 120 may modify a volume of bands (1) and (3) to attenuate unwanted signals, thereby improving the intelligibility of the voice band (e.g., between 85 Hz-180 Hz).

Figure 2A:
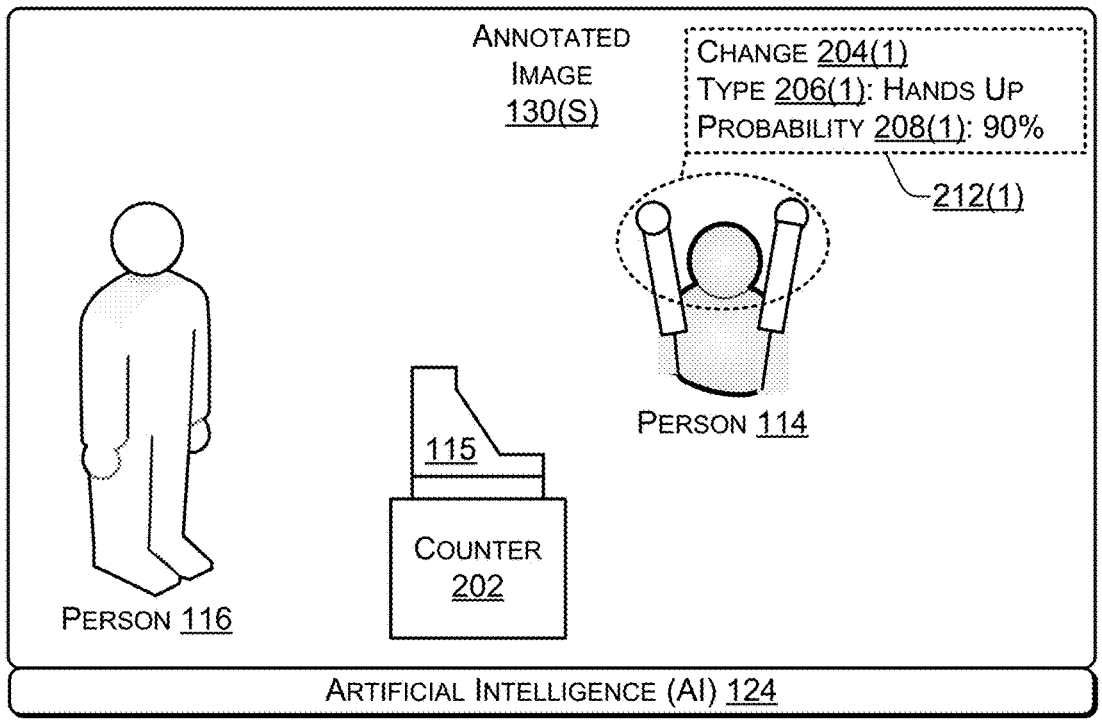
FIG. 2A and FIG. 2B illustrate images of an interior of a building, according to some embodiments.
Figure 2B:
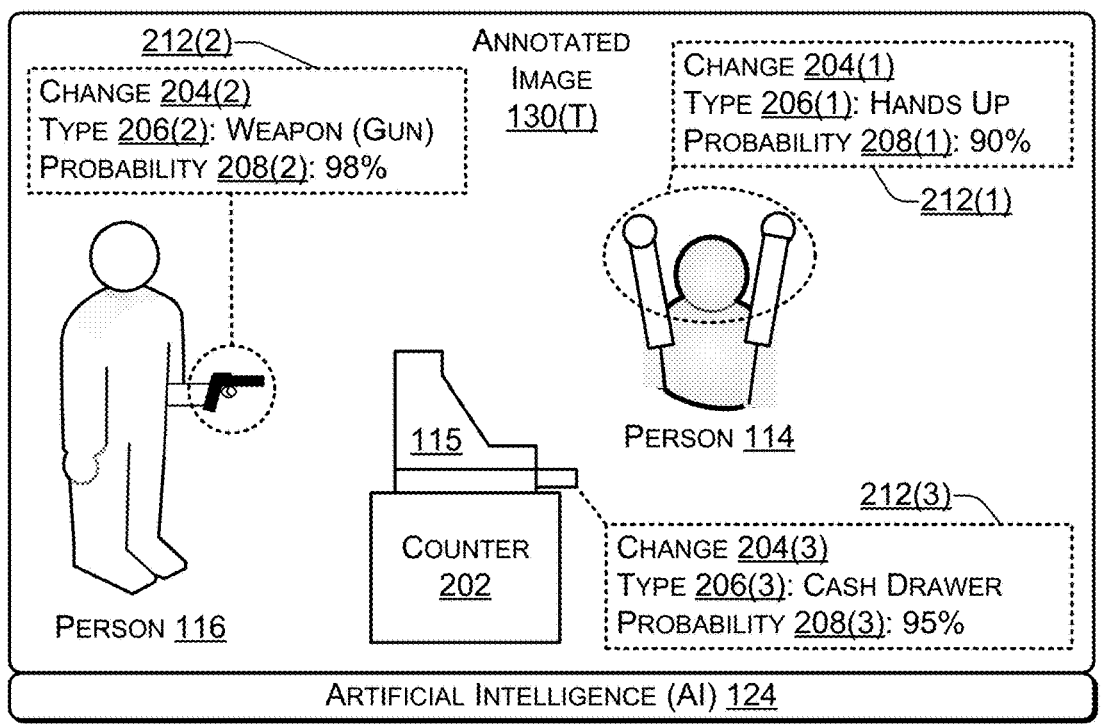

FIG. 2A and FIG. 2B illustrate annotated images of an interior of a building, according to some embodiments. The annotated images 130 of FIG. 1 may include an annotated image 130(S) of FIG. 2A captured at a time S and an annotated image 130(T) of FIG. 2B captured at a time T, where T>S. Thus, annotated image 130(T) is subsequent to annotated image 130(S). The artificial intelligence (AI) 124 of FIG. 1 may add annotations 212, such as change information, to the processed data 122 or the output 118 of the security system 102, to create the annotated images 130.

The annotated image 130(S) of FIG. 2A includes the person 114 (e.g., first person), the person 116 (e.g., second person), and the object 115 (e.g., a point-of-sale terminal) located on a counter 202. In the annotated image 130(S), an annotation 212(1) indicates that the person 114 has their hands up. The annotation 212(1) provided by the AI 124 may include information that a change 204(1) was detected, a type 206(1) of change (e.g., a threat), e.g., the person 114 has their hands up, and a probability 208(1) of the predicted threat. The annotation 212(1) may be displayed with a visual linking (e.g., using lines, as shown in FIGS. 2A and 2B, or a similar technique) to the locus. In annotated image 130(S), the annotation 212(1) is associated with the person 114 (e.g., the locus) and specifically the first person's hands. In some cases, the probability 208(1) may increase over time. For example, at a time T1, when the person 114 (e.g., first person) puts their hands up, the AI 124 may determine that no other change is present and may predict, based on past experience, that the person 114 (e.g., first person) is stretching their arms. However, if at a time Tx (x>0, such as 10 seconds) the person 114 (e.g., first person) still has their hands up, then the AI 124 may determine that a change is present. The probability 208(1) of a change may increase proportional to the amount of time that the person 114 (e.g., first person) has their hands up. For example, after one second the probability may be 10%, after two seconds the probability may be 20% and so on, and the probability of a change at ten seconds (or more) may be 100%. In some cases, the probability of a change may be determined based on how many frames include the person 114 making a particular gesture. For example, in FIGS. 2A and 2B, T-S represents how long the person 114 has had their hands up. If T-S>=V, where V is a predetermined period of time, then the AI 124 may determine that a change is present. If T-S<V, then the AI 124 may determine that a change is absent (e.g., no change present).

The postures detected by the AI 124 may include, for example, crouching and lying down. Crouching includes adopting a position in which the knees are bent and the upper body is brought forward and down, e.g., to avoid detection.

In FIG. 2B, the annotated image 130(T) has multiple annotations 212(1), 212(2), and 212(3). Annotated image 130(T) is subsequent to annotated image 130(S) and has the annotation 212(1) indicating that the person 114 has their hands up and an annotation 212(2) indicating that a change 204(2) was detected with the person 116. The annotation 212(2) indicates that a type 206(2) of the change is a presence of a weapon. In some cases, the AI 124 may further identify the type of weapon. For example, as shown in FIG. 2B, the AI 124 has identified the weapon as a gun and indicated this in the annotation 212(2). The AI 124 may identify in the annotation 212(2) a probability 208(2) associated with the identification of the type 206(2), e.g., a weapon. In this example, the AI 124 indicates that a weapon in the form of a gun has been identified with the probability of 98%.

In FIG. 2B, the AI 124 may identify multiple threats, including a first change associated with the person 114 (locus 1) and a second change associated with the person 116 (locus 2). Based on the thresholds 128, the identification of two threats may be sufficient to satisfy one of the thresholds 128, causing the server 106 of FIG. 1 to automatically send the notification 134 including the link 136 to the recipients 138. In FIG. 2B, even if the person 114 has not had their hands up for very long (e.g., less than 1 second), the AI 124 may determine that one of the thresholds 128 is satisfied because the AI 124 detected the second threat, e.g., the weapon being held by the person 116.

The AI 124 may provide an annotation 212(3) indicating a third change 204(3) (e.g., a threat) with a type 206(3) of a partially or fully empty cash register (locus 3), with a probability 208(3) that this is a change of 95%. The third change 204(3) is associated with an object in the location 104 of FIG. 1 and may be a cash tray of the point-of-sale terminal 115, a safe, a shelf that holds high value objects (e.g., jewelry) or the like. The thresholds 128 may indicate that if change 204(3) and either change 204(2) or 204(1) are detected, to automatically (without human interaction) perform one or more of the notification actions 132. The thresholds 128 may be initially created by an owner of a business or the security system provider and then modified (e.g., adjusted) by the AI 124. For example, the AI 124 may be periodically (e.g., at a predetermined time interval, such as every P months, P>0) be retrained with additional data to further increase accuracy. By training the AI 124 using additional training data, the AI 124 may identify at least some additional thresholds to add to the thresholds 128.

In some cases, the annotations 212 may indicate a length that each change (e.g., threat) has been present, e.g., either in terms of a number of images in which the change has been identified, a length of time during which the change has been identified, or both. In other cases, each of the annotations 212 may be added to the images after a predetermined length. For example, each of the annotations 212 may be added after the change was detected in at least X images (e.g., at a particular fps) or for at least Y seconds.

Thus, an AI module may identify one or more threats in an image and annotate the image to indicate the presence of a change (e.g., a threat), identify the type of change, provide a probability associated with the prediction of the change, and other change-related information. The change may be associated with a first person (e.g., employee), such as the first person putting their hands up in the air, the first person hiding behind a counter or other furniture, or the like. The change may be associated with a second person that is located near the first person, such as a second person with a weapon, a second person that is making a threatening gesture, or the like. The change may be associated with an object in the location, such as a cash drawer, a safe, a shelf that includes valuable objects (e.g., jewelry), a wall, a window, a statue, an artifact, or the like. Based on the number of threats detected, the type of threats, how long the threats have been present, and the like, a determination may be made whether one or more thresholds have been satisfied. If one of the thresholds has been satisfied, then a notification may be sent to one or more recipients to notify them of the detected threat. The recipients may include, for example, law enforcement, security company, an owner or a manager of a business, another type of recipients, or any combination thereof.

Figure 3A:
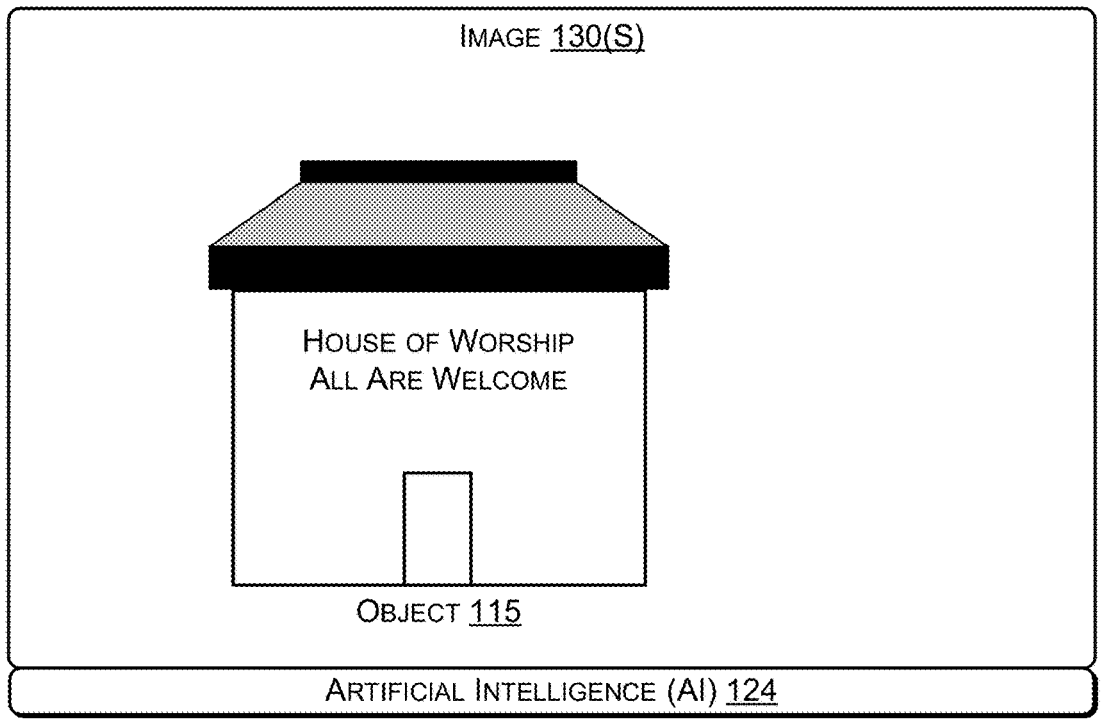
FIG. 3A and FIG. 3B illustrate images of an exterior of a building, according to some embodiments.
Figure 3B:
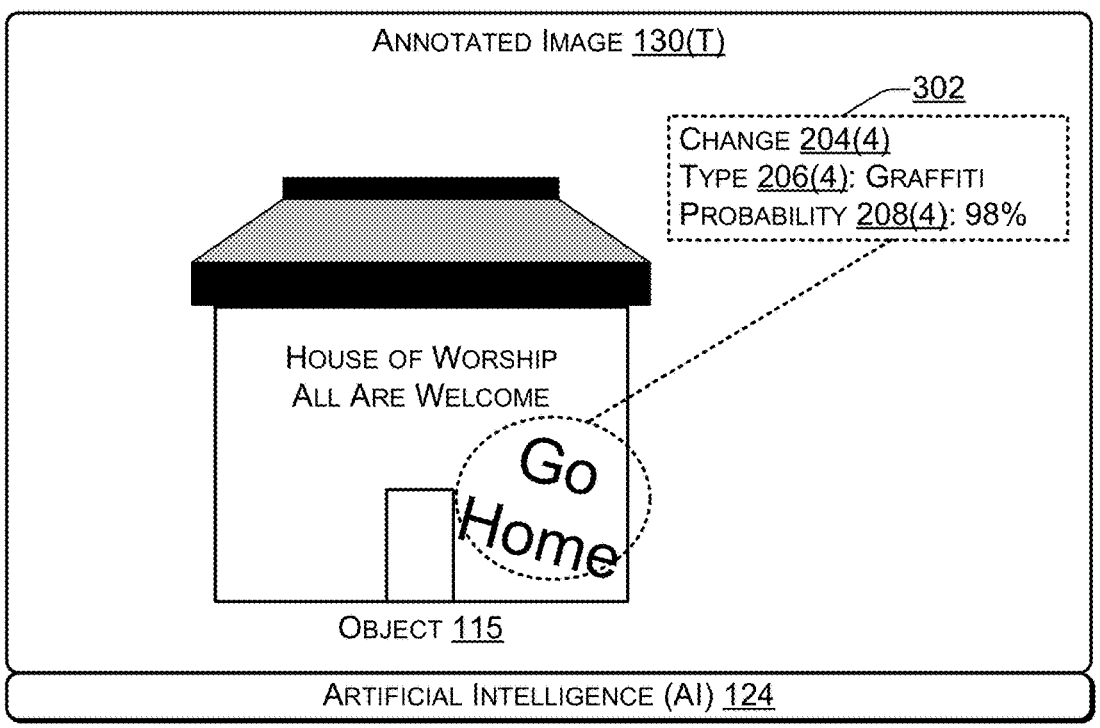

FIG. 3A and FIG. 3B illustrate images of an exterior of a building, according to some embodiments. The annotated images 130 of FIG. 1 may include the annotated image 130(S) of FIG. 3A captured at a time S and the annotated image 130(T) of FIG. 3B captured at a time T, where T>S. The artificial intelligence (AI) 124 of FIG. 1 may add annotations 302 (e.g., change information) to the processed data 122 or to the output 118 of the security system 102, to create the annotated images 130.

In FIG. 3A, the annotated image 130(S) includes the object 115, e.g., a building, such as a house of worship (e.g., a church, a temple, a mosque, or the like). The annotated image 130(S) does not include any annotations because the AI 124 has not detected any changes to the exterior of the object 115.

In FIG. 3B, the annotated image 130(T) includes the object 115 and an annotation 302 that indicates that the AI 124 has detected a change 304 to the object 115. The annotation 302 indicates that a type 206(4) of the change 304 is predicted to be graffiti, with a probability 208(4) of 98%.

In identifying the change 204(4), the AI 124 may determine that the object 115 appeared similar (e.g., less than a threshold amount of change) to its appearance in image 130(S) for at least a first predetermined number of frames (or a first predetermined amount of time) prior to the change 204(4). After detecting the change 204(4) between the object 115 in image 130(3) and in image 130(T), the AI 124 may determine that the change exceeds a threshold amount of change and is persistent (e.g., not caused by weather, or another temporary factor) because the change is present for at least a second predetermined number of frames (or a second predetermined amount of time). The AI 124 may, in some cases, use optical character recognition (OCR) to determine that the change 204(4) includes graffiti by recognizing the characters.

Figure 4A:
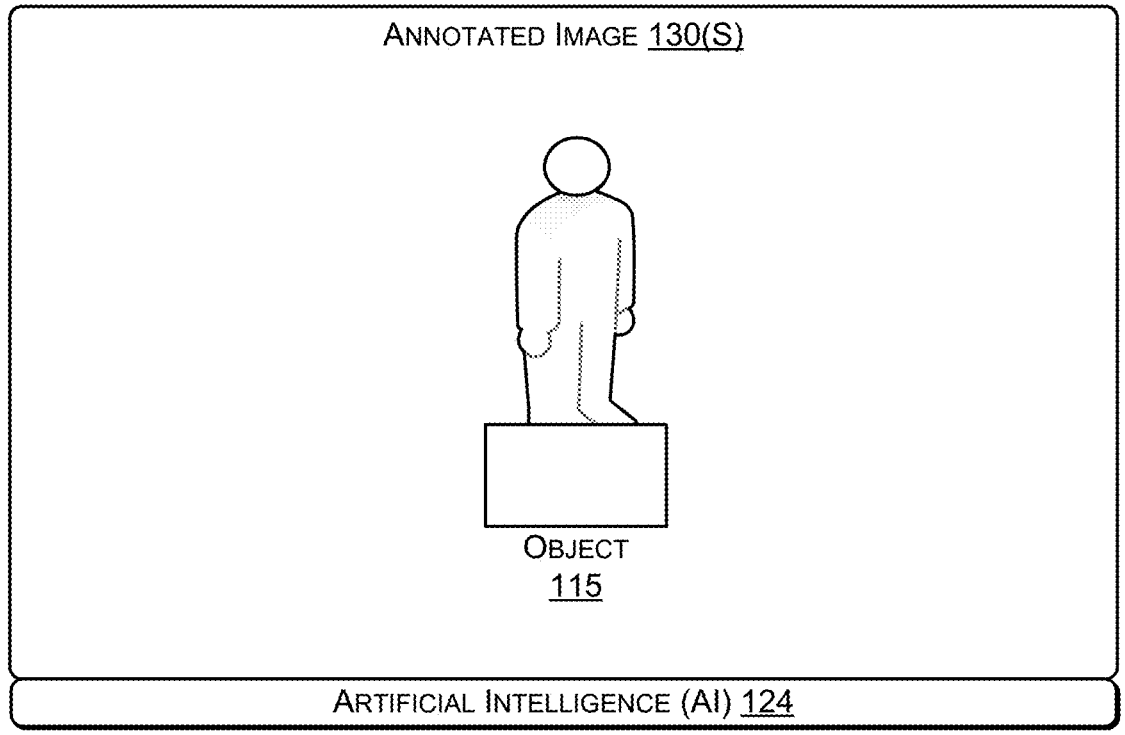
FIG. 4A and FIG. 4B illustrate images that include an object (e.g., a statue), according to some embodiments.
Figure 4B:
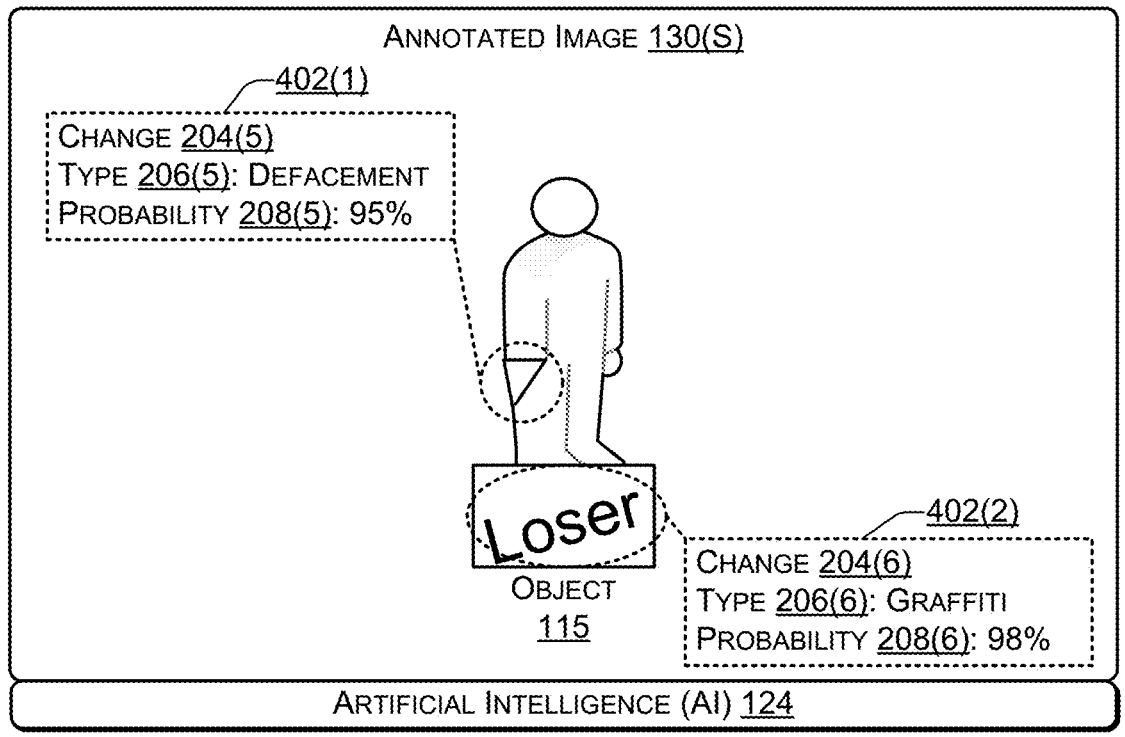

FIG. 4A and FIG. 4B illustrate annotated images that include an object (e.g., a statue or an artifact), according to some embodiments. The annotated images 130 of FIG. 1 may include the annotated image 130(S) of FIG. 4A captured at a time S and the annotated image 130(T) of FIG. 4B captured at a time T, where T>S. The artificial intelligence (AI) 124 of FIG. 1 may add annotations 312 (e.g., change information) to the processed data 122 or to the output 118 of the security system 102, to create the annotated images 130.

In FIG. 4A, the annotated image 130(S) includes the object 115, e.g., a statue or another type of object (e.g., non-building). The annotated image 130(S) does not include any annotations because the AI 124 has not detected any changes to the object 115.

In FIG. 4B, the annotated image 130(T) includes the object 115 and an annotation 402(1) that indicates that the AI 124 has detected a change 204(5) to the object 115. The annotation 402(1) indicates that a type 206(5) of the change 204(5) is predicted to be defacement, with a probability 208(5) of 95%. The annotated image 130(T) includes an annotation 402(2) that indicates that the AI 124 has detected a change 204(6) to the object 115. The annotation 402(2) indicates that a type 206(6) of the change 204(6) is predicted to be graffiti, with a probability 208(6) of 98%.

In identifying the changes 204(5), 204(6), the AI 124 may determine that the object 115 appeared similar (e.g., less than a threshold amount of change) to its appearance in image 130(S) for at least a first predetermined number of frames (or a first predetermined amount of time) prior to the changes 204(5), 204(6). After detecting the change 202(4) between the object 115 in image 130(3) and in image 130(T), the AI 124 may determine that the change exceeds a threshold amount of change, e.g., the changes 204(5), 204(6) are significant, and are persistent (e.g., not caused by weather, or another temporary factor) because the change is present for at least a second predetermined number of frames (or a second predetermined amount of time).

Of course, FIGS. 3A, 3B, 4A, and 4B are merely examples of annotations of objects (e.g., located inside a building or outside a building) and it should be understood that the AI 124 may be trained to detect a change to any type of object, including but not limited to the exterior of a building, statue, an artifact, art work (e.g., wall mural painted on the exterior of a building), or the like.

Figure 5:
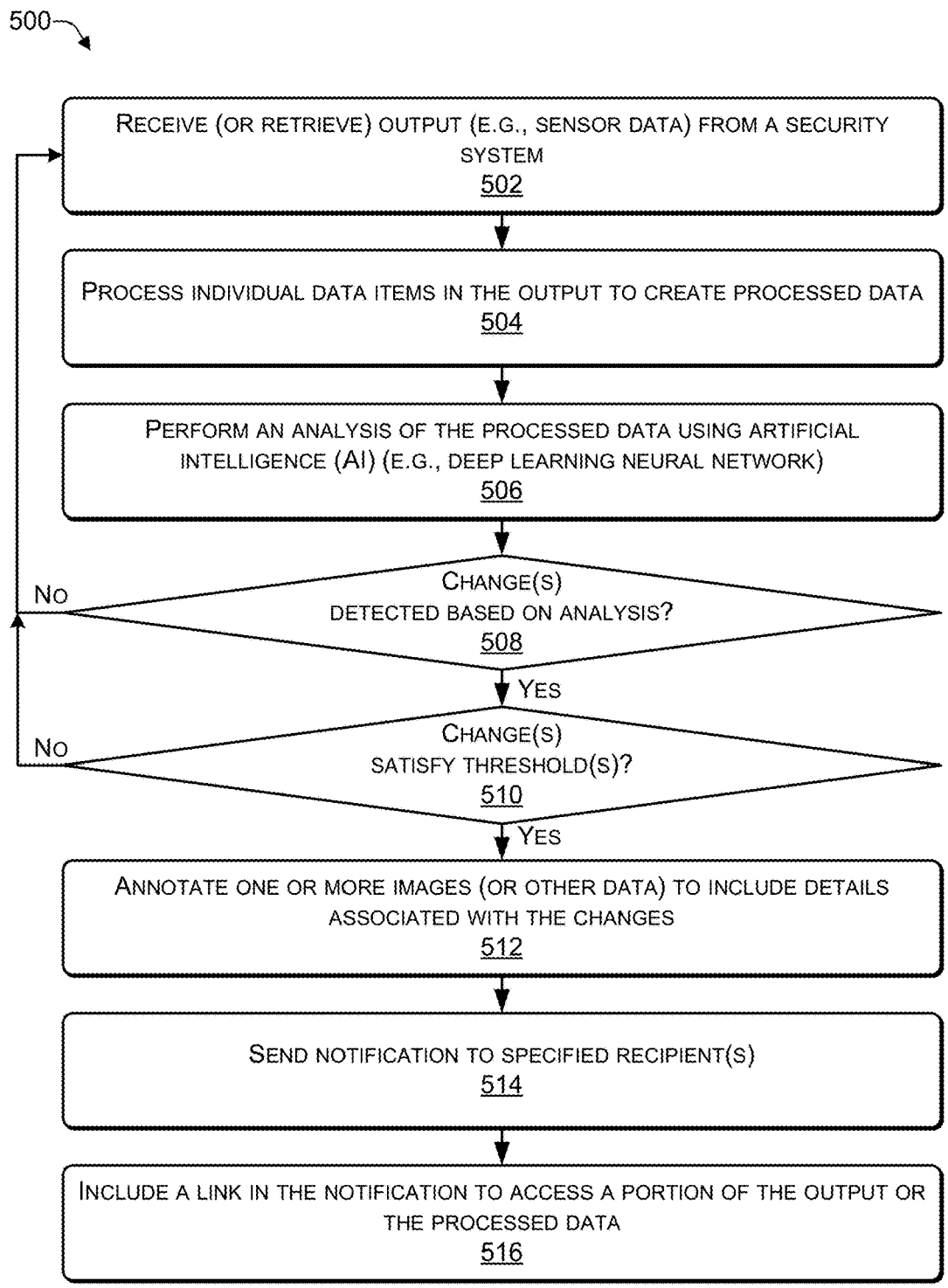
FIG. 5 is a flowchart of a process that includes sending a notification to one or more recipients after determining a change, according to some embodiments.
Figure 6:
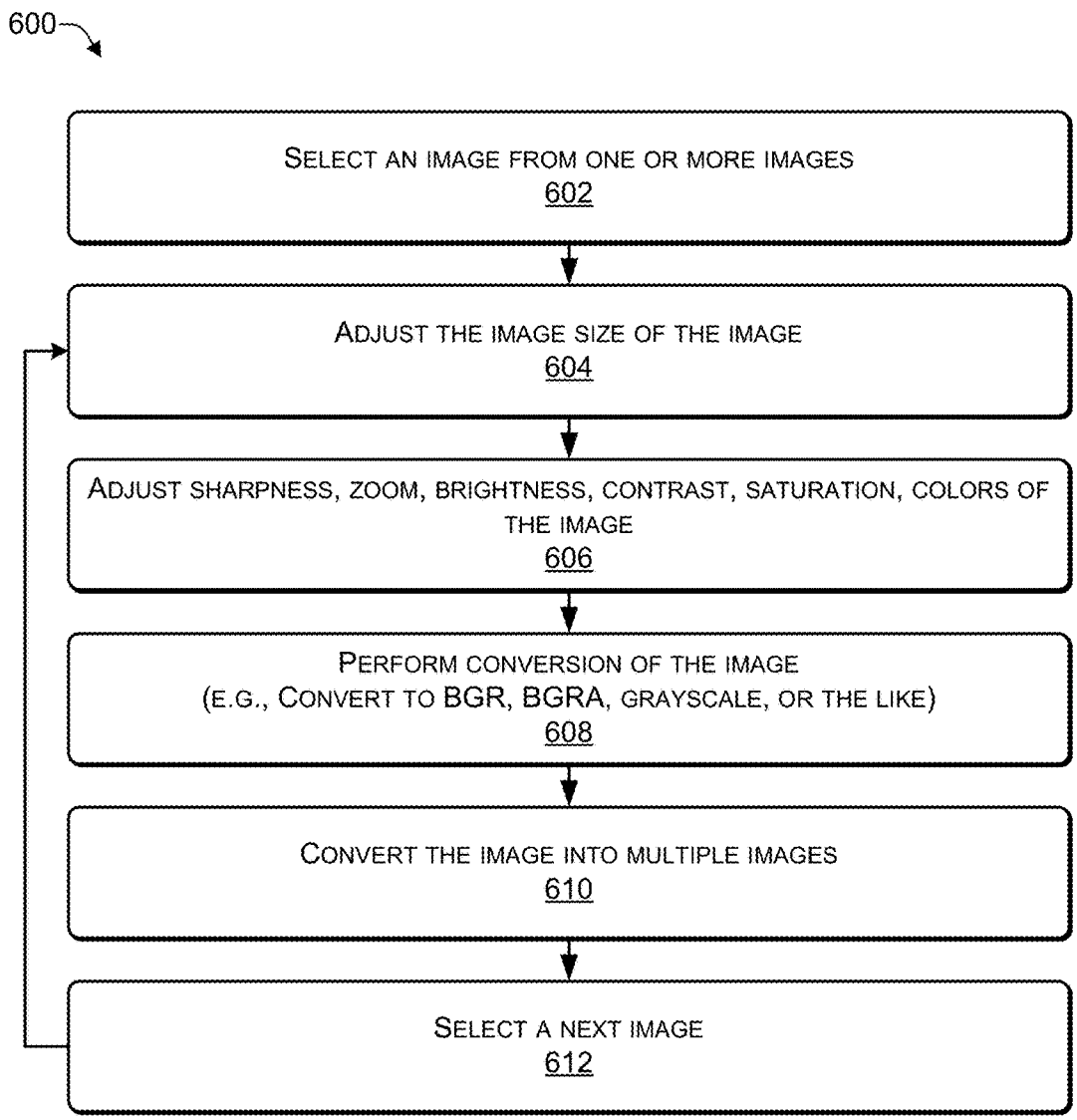
FIG. 6 is a flowchart of a process that includes adjusting various characteristics of an image, according to some embodiments.
Figure 7:
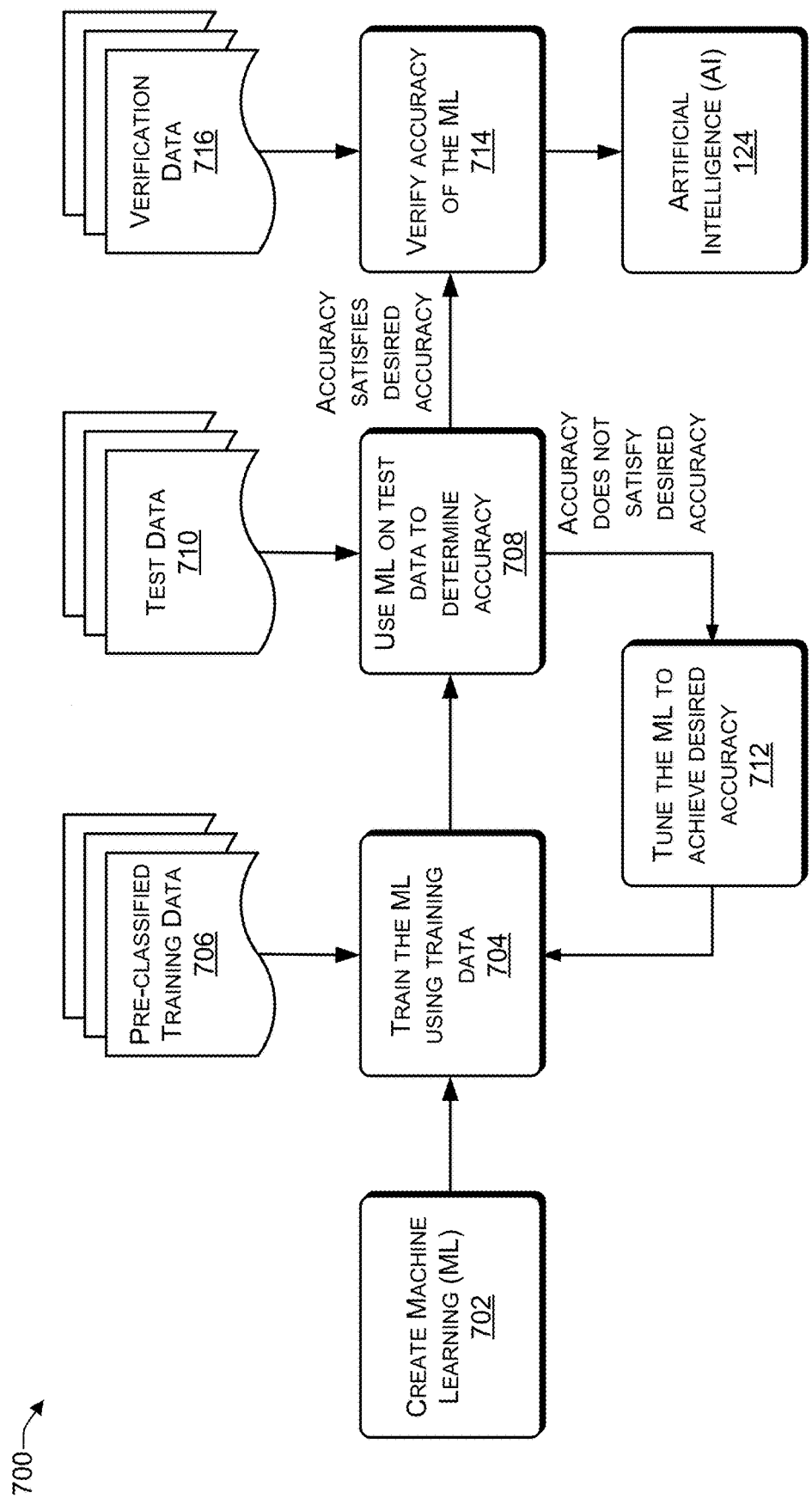
FIG. 7 is a flowchart of a process to train a machine learning algorithm to create a classifier, according to some embodiments.

In the flow diagrams of FIGS. 5, 6, and 7 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500, 600, and 700 are described with reference to FIGS. 1, 2A, 2B, 3A, 3B, 4A, and 4B as described above, although other models, frameworks, systems and environments may be used to implement this process.

FIG. 5 is a flowchart of a process that includes sending a notification to one or more recipients after determining a change (e.g., including detecting one or more threats), according to some embodiments. The process 500 may be performed by the server 106 of FIG. 1. Of course, in some cases, at least a portion of the functionality described as being performed by the server 106 may be located at the location 104. For example, the processing 120, the AI 124, the change detection 126, the thresholds 128, the annotated friends 130, the notification actions 132, or any combination thereof may be performed at the location 104 by a computing device that is connected to the security system 102 or by the security system 102 itself.

At 502, the server may receive or retrieve an output (e.g., sensor data, such as images and/or audio data) from a security system. At 504, the server may process individual sensor data items (e.g., images, audio data, and the like) in the output (e.g., in each stream) to create processed data (e.g., processed images, processed audio, and the like). For example, in FIG. 1, the server 106 may receive the output 118 from the security system 102 and use the processing module 120 to create the processed data 122. The processed data 122 may be processed to increase machine readability to enable the AI 124 to detect threats in the processed data 122 (e.g., processed images, processed audio, or the like).

At 506, the server may perform an analysis of the processed data using artificial intelligence (e.g., a deep learning neural network, such as a convolutional neural network). At 508, the server may determine whether changes detected based on the analysis. If the server determines, at 508, that no changes were detected based on the analysis, then the process may proceed back to 502. If the server determines, at 508 that one or more changes were detected based on the analysis, then the process may proceed to 510. For example, in FIG. 1, the server 106 may perform an analysis of the processed data 122 using the AI 124. Based on the analysis, the server 106 may determine whether the processed data 122 indicates one or more changes (e.g., the person 114 holding up their hands, a weapon in the possession of the person 116, cash being removed from the point-of-sale terminal 115, graffiti or defacement of the object 115, or the like). If the server 106 determines that the AI 124 detected no changes, then the server 106 may continue to process the output 118 from the security system 102 and analyze the processed data 122 using the AI 124.

At 510, the server may determine whether the changes that were detected satisfy one or more thresholds. If the server determines, at 510, that the changes that were detected fail to satisfy the one or more thresholds, then the process may proceed to 502, where the server receives additional output. If the server determines, at 510, that the changes that were detected satisfy one or more of the thresholds, then the process may proceed to 512. For example, the server 106 may determine whether the changes between FIG. 3A and FIG. 3B or between FIG. 4A and FIG. 4B are significant (e.g., greater than a threshold amount) and are persistent (e.g., present for more than a threshold amount of time). If the change(s) are significant and persist for more than a threshold amount of time, then the sensor data is annotated, substantially in real time.

At 512, the server may annotate one or more images (or other data) to include details associated with the change. At 514, the server may send a notification to one or more specified recipients. At 516, the server may include a link in the notification to enable the specified recipient(s) to access a portion of the output or a portion of the processed data (e.g., one or more of the annotated images or the unannotated images). For example, in FIG. 2B, the AI 124 may create the annotated image 130(T) that includes the annotations 212(1), 212(2), and 212(3). FIG. 3B and FIG. 4B illustrate examples of annotations to objects. In FIG. 1, after determining that the changes (e.g., threats) detected in the processed data 122 satisfy at least one of the thresholds 128, the AI 124 may create the annotated images 130 and perform one or more of the notification actions 132. For example, the server 106 may send the notification 134 to one or more of the recipients 138 specified in the notification actions 132. In some cases, the server 106 may include the link 136 in the notification 134 to enable the recipients 138 to view at least a portion of the annotated images 130, the output 118, or both. If the output 118 includes audio data, the link 136 may enable the recipients 138 to listen to a portion of the output 118 or a portion of the processed (audio) data 122.

Thus, a server may receive the output (e.g., sensor data, including multiple video streams) of a security system that includes multiple sensors. The server may process the output to improve their machine readability and create processed data (e.g., processed images, processed audio, and the like). The server may use an AI, such as a deep learning neural network, to analyze the processed data. If the AI detects one or more changes in the processed data, the AI may annotate the images to indicate the type of change, the locus of the change, how long the change has been present, other details associated with the change, and the like. The server may determine whether the change satisfies one or more thresholds (e.g., specified based on types of changes, number of changes, how long the changes are present, and the like). If the changes fail to satisfy the one or more thresholds, the server may continue to process the output of the security system. If the changes satisfy at least one of the thresholds, then the server may send a notification to one or more previously specified recipients and, in some cases, include a link in the notification to enable the specified recipients to view at least a portion of the annotated images. The advantage provided is that a person does not have to call the authorities (e.g., law enforcement), enabling 24-hour detection of changes, even when no humans are present. The system uses AI to automatically identify changes, determine whether the changes satisfy one or more thresholds, and when the changes satisfy at least one of the thresholds, the system may automatically send a notification to one or more recipients, such as someone responsible for monitoring the location in which the object is located, such as a security company that monitors the location, law enforcement, another recipient, or any combination thereof. By reducing the time between when a change occurs and when one or more recipients are notified of the change, perpetrators of the change can be quickly apprehended, sometimes before they have left the location or shortly after they have left the location.

FIG. 6 is a flowchart of a process 400 that includes adjusting various characteristics of an image, according to some embodiments. The process 400 may be performed by the processing module 120 of FIG. 1.

At 602, the process may select a image from a stream of one or more images (e.g., video). At 604, the process may adjust an image size of the image. At 606, the process may adjust one or more of sharpness, zoom, brightness, contrast, saturation, colors, or any combination thereof associated with the image. At 608, the process may perform a conversion of the image from a first format to a second format. For example, in FIG. 1, each of the images of the output 118 may be captured in a particular size, such as 800×600, 1200×900, 1280×720, 1920×1080 pixels, or the like. To enable rapid processing of the output 118, in some cases the size may be reduced. For example, the processing module 120 may reduce a size of images (e.g., from 1200×900 to 800×600) to enable faster processing of the processed data 122. The processing module 120 may modify the sharpness of one or more images from the output 118 to enable the AI 124 to more easily detect threats. The processing module 120 may perform zooming (e.g., digital zoom) of individual images in the output 118. For example, the processing module 120 may divide an individual image into three portions, a first portion that includes the person 114 (e.g., first person), a second portion that includes an object, such as the point-of-sale terminal 115, and a third portion that includes the person 116 (e.g., second person). In this way, the AI 124 can analyze each of the three portions to determine whether there is a change associated with the person 114, the point-of-sale terminal 115, or the person 116. The processing 120 may adjust the brightness, contrast, saturation, and number of colors to enable the AI 124 to more easily detect threats in the processed data 122. In some cases, the selected image may be captured as or converted (by the processing 120) to a format such as RGB (Red, Green, Blue), RGBA (Red, Green, Blue, Alpha), BGR (Blue, Green, Red), BGRA (Blue, Green, Red, Alpha), or grayscale.

Thus, images output by a security system may be processed to enable an AI to more easily detect threats. For example, the video processing may be used to make the processed data machine readable for inferencing and training.

FIG. 7 is a flowchart of a process 700 to train a machine learning algorithm to create the AI 124, according to some embodiments. The process 700 may be performed by a server, such as the server 106 of FIG. 1.

At 702, a machine learning algorithm (e.g., software code) may be created by one or more software designers. At 704, the machine learning algorithm may be trained using pre-classified training data 706 (e.g., a portion of the conversation data 136 that has been pre-classified). For example, the training data 706 may have been pre-classified by humans, by machine learning, or a combination of both. After the machine learning has been trained using the pre-classified training data 706, the machine learning may be tested, at 708, using test data 710 to determine an accuracy of the machine learning. For example, in the case of a classifier, the accuracy of the classification may be determined using the test data 710.

If an accuracy of the machine learning does not satisfy a desired accuracy (e.g., 95%, 98%, 99% accurate), at 708, then the machine learning code may be tuned, at 712, to achieve the desired accuracy. For example, at 712, the software designers may modify the machine learning software code to improve the accuracy of the machine learning algorithm. After the machine learning has been tuned, at 712, the machine learning may be retrained, at 704, using the pre-classified training data 706. In this way, 704, 708, 712 may be repeated until the machine learning is able to classify the test data 710 with the desired accuracy.

After determining, at 708, that an accuracy of the machine learning satisfies the desired accuracy, the process may proceed to 714, where verification data 716 (e.g., a portion of the conversation data 136 that has been pre-classified) may be used to verify an accuracy of the machine learning. After the accuracy of the machine learning is verified, at 714, the machine learning 130, which has been trained to provide a particular level of accuracy may be used as the AI 124. For example, the AI 124 may be trained to predict a type of weapon, what a particular facial expression indicates, what a particular posture indicates, what a particular hand gesture indicates, what graffiti looks like, what defacement looks like, recognizing threatening words and phrases in audio data, not detecting weather-related changes as graffiti or defacement, not detecting animal defecation (e.g., bird poop, dog poop, or the like) as graffiti or defacement, and the like.

Figure 8:
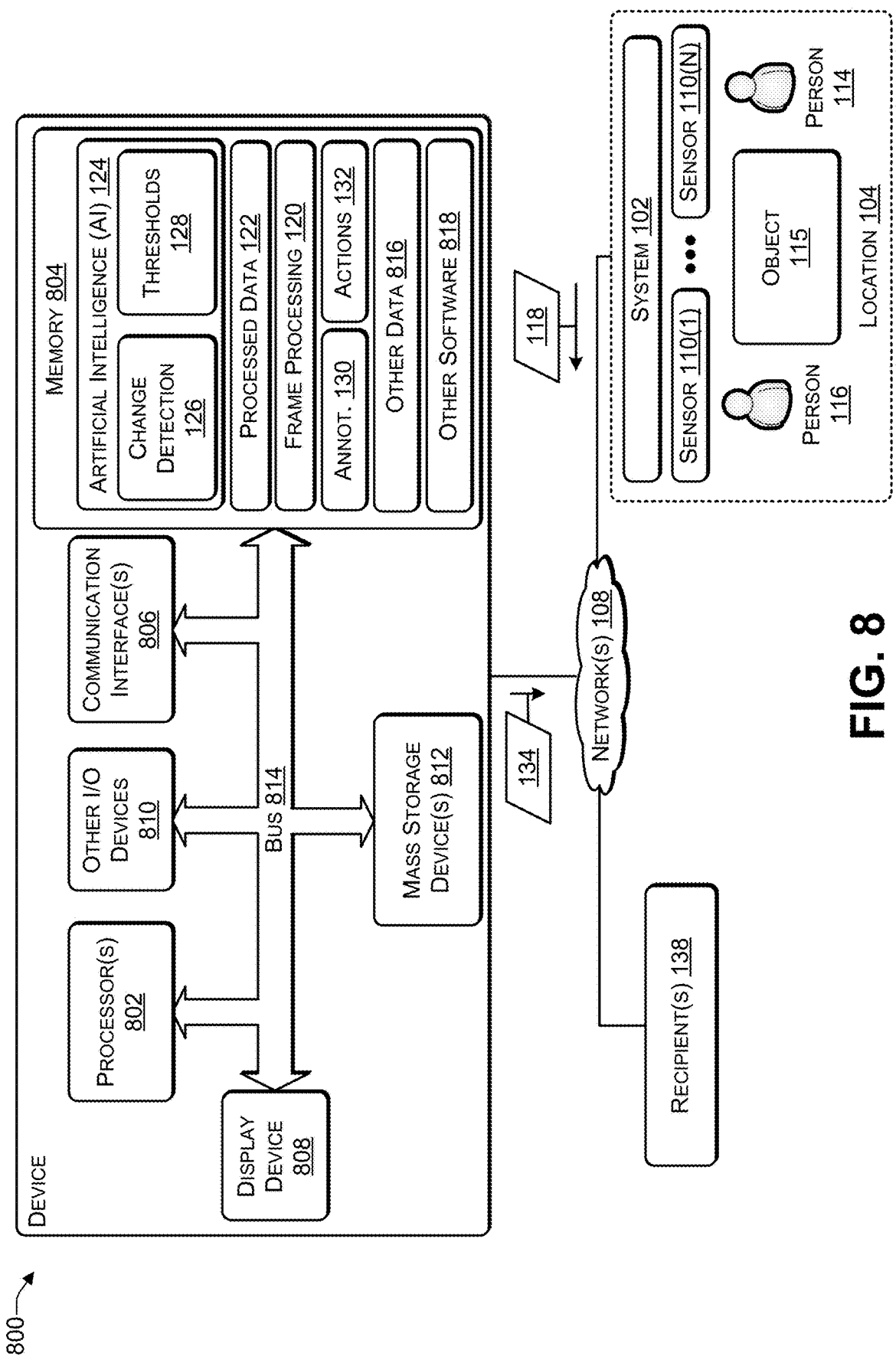
FIG. 8 illustrates an example configuration of a computing device that can be used to implement the systems and techniques described herein.

FIG. 8 illustrates an example configuration of a device 800 that can be used to implement the systems and techniques described herein, such as for example, the security system 102, a computing device located at the location 104, and/or the server 106 of FIG. 1. For illustration purposes, the device 800 is illustrated in FIG. 8 as implementing the server 106 of FIG. 1.

The device 800 may include one or more processors 802 (e.g., central processing unit (CPU), graphics processing unit (GPU), or the like), a memory 804, communication interfaces 806, a display device 808, other input/output (I/O) devices 810 (e.g., keyboard, trackball, and the like), and one or more mass storage devices 812 (e.g., disk drive, solid state disk drive, or the like), configured to communicate with each other, such as via one or more system buses 814 or other suitable connections. While a single system bus 814 is illustrated for ease of understanding, it should be understood that the system buses 814 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 802 are one or more hardware devices that may include a single processing unit or a number of processing units, all of which may include single or multiple computing units or multiple cores. The processors 802 may include a graphics processing unit (GPU) that is integrated into the CPU or the GPU may be a separate processor device from the CPU. The processors 802 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 802 may be configured to fetch and execute computer-readable instructions stored in the memory 804, mass storage devices 812, or other computer-readable media.

Memory 804 and mass storage devices 812 are examples of computer storage media (e.g., memory storage devices) for storing instructions that can be executed by the processors 802 to perform the various functions described herein. For example, memory 804 may include both volatile memory and non-volatile memory (e.g., RAM, ROM, or the like) devices. Further, mass storage devices 812 may include hard disk drives, solid-state drives, removable media, including external and removable drives, memory cards, flash memory, floppy disks, optical disks (e.g., CD, DVD), a storage array, a network attached storage, a storage area network, or the like. Both memory 804 and mass storage devices 812 may be collectively referred to as memory or computer storage media herein and may be any type of non-transitory media capable of storing computer-readable, processor-executable program instructions as computer program code that can be executed by the processors 802 as a particular machine configured for carrying out the operations and functions described in the implementations herein.

The device 800 may include one or more communication interfaces 806 for exchanging data via the network 108. The communication interfaces 806 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 806 can also provide communication with external storage, such as a storage array, network attached storage, storage area network, cloud storage, or the like.

The display device 808 may be used for displaying content (e.g., information and images) to users. Other I/O devices 810 may be devices that receive various inputs from a user and provide various outputs to the user, and may include a keyboard, a touchpad, a mouse, a printer, audio input/output devices, and so forth.

The computer storage media, such as memory 804 and mass storage devices 812, may be used to store software and data, including, for example, the AI 124, the processed data 122, the processing 120, the notification actions 130, other data 816, and other software 818. For ease of illustration, not all the software and data associated with the server 106 are shown.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A server comprising:
one or more processors; and
one or more non-transitory computer-readable storage media to store instructions executable by the one or more processors to perform operations comprising:
receiving a video stream comprising a plurality of frames from a security system;
processing a frame from the plurality of frames to create a processed frame;
performing an analysis of the processed frame using an artificial intelligence module executed by the one or more processors;
determining, based on the analysis, that the processed frame includes a change to a state of an object;
determining, based on the analysis, details associated with the change to the state of the object;
determining, based on the details associated with the change to the state of the object, that a particular threshold of a plurality of thresholds has been satisfied, the particular threshold comprising one of:
a length of time that a particular type of change is present; or
a consecutive number of frames that the particular type of change is present;
annotating the processed frame to create an annotated frame that includes the change and at least a portion of the details associated with the change to the state of the object; and
sending a notification to a designated recipient, the notification including a link to view the annotated frame.

2. The server of claim 1, wherein the change to the state of the object comprises a change in:
a presence or absence of the object;
an orientation of the object;
a position of the object;
a color of the object;
a location of the object;
a material of the object;
a texture of the object;
a shape of the object;
a light on the object;
a reflection of the object;
a size of the object;
a visibility of the object;
a surface area of the object; or
any combination thereof.

3. The server of claim 1, wherein determining, based on the analysis, that the processed frame includes the change to the state of the object comprises:
determining that a substance is present on at least a portion of the object.

4. The server of claim 1, wherein determining, based on the analysis, that the processed frame includes the change to the state of the object comprises:
determining that at least a portion of the object includes defacement.

5. The server of claim 4, wherein the defacement comprises:
scratching at least the portion of the object;
removing at least the portion of the object from the object; or
both.

6. The server of claim 1, wherein processing the frame from the plurality of frames to create the processed frame comprises:
adjusting a frame size of the frame;
adjusting a sharpness of the frame;
adjusting a zoom of the frame;
adjusting a brightness of the frame;
adjusting a contrast of the frame;
adjusting a color saturation of the frame;
adjusting one or more colors of the frame;
converting the one or more colors of the frame to a grayscale;
converting the frame into two or more portions of the frame;
adjusting a resolution of the frame;
stitching one or more frames into a single frame; or
any combination thereof.

7. The server of claim 1, wherein the artificial intelligence module uses a deep learning neural network.

8. A server comprising:
one or more processors; and
one or more non-transitory computer-readable storage media to store instructions executable by the one or more processors to perform operations comprising:
receiving a video stream from a security system;
processing a frame from the video stream to create a processed frame;
performing an analysis of the processed frame using an artificial intelligence module, the analysis identifying in the processed frame at least one of:
a posture of a person,
a gesture performed by the person,
a facial expression of the person,
a weapon, or
a state of an object;
determining, based on the analysis, that the processed frame includes one or more threats;
determining, based on the analysis, details associated with individual threats of the one or more threats;
determining, based on the details associated with the one or more threats, that a particular threat threshold of a plurality of threat thresholds has been satisfied, the particular threat threshold comprising one of:
a particular type of threat;
a length of time that the particular type of threat is present; or
a consecutive number of frames in which the individual threats have been detected;
annotating the frame to create an annotated frame that includes the one or more threats and at least a portion of the details associated with individual threats of the one or more threats; and
sending a notification to a designated recipient, the notification including a link to view the annotated frame.

9. The server of claim 8, wherein the posture associated with the person comprises at least one of:
holding both arms up,
holding both hands behind a person's head,
holding both hands behind a person's back,
crouching,
lying down,
push,
fist fight,
kick,
punch,
slap, hackling,
shoving,
hands over a person's face,
hands over another person's body,
hands tied,
legs tied,
hiding behind an object,
crouching behind an object,
a presence of a person in an area that the person is not authorized to be present in,
bent over,
shaking,
trembling,
standing,
seating,
walking,
running,
snatching,
an injured posture, or
any combination thereof.

10. The server of claim 8, wherein processing the frame to create the processed frame comprises:
adjusting a frame size of the frame;
adjusting a sharpness of the frame;
adjusting a zoom of the frame;
adjusting a brightness of the frame;
adjusting a contrast of the frame;
adjusting a color saturation of the frame;
adjusting one or more colors of the frame;
adjusting a resolution of the frame;
stitching one or more frames into a single frame
converting the one or more colors of the frame to a grayscale;
converting the frame into two or more portions of the frame; or
any combination thereof.

11. The server of claim 8, wherein the facial expression indicates:
fear,
surprise,
anger,
aggression,
pain,
hurt,
distress,
aggravation,
being bullied, or
any combination thereof.

12. The server of claim 8, wherein the details associated with individual threats include:
a locus comprising one of the person, or the object;
a threat type;
a threat level determined based at least in part on the facial expression of the person, a threatening gesture, or the weapon in the processed frame;
a length of time individual threats have been detected;
a consecutive number of frames that individual threats have been detected;
a probability associated with the threat type; or
any combination thereof.

13. The server of claim 8, wherein the gesture comprises:
a first gesture that indicates a presence of a threat; or
a second gesture performed near a particular sign.

14. The server of claim 8, wherein the artificial intelligence module uses a deep learning neural network.

15. One or more non-transitory computer-readable storage media to store instructions executable by the one or more processors to perform operations comprising:
receiving a video stream from a security system;
processing a frame from the video stream to create a processed frame;
performing an analysis of the processed frame using an artificial intelligence module, the analysis identifying in the processed frame at least one of:
a posture of a person,
a gesture performed by the person,
a facial expression of the person,
a weapon, or
a state of an object;
determining, based on the analysis, that the processed frame includes one or more threats;
determining, based on the analysis, details associated with individual threats of the one or more threats;
determining, based on the details associated with the one or more threats, that a particular threat threshold of a plurality of threat thresholds has been satisfied, the particular threat threshold comprising:
a particular type of threat; and
a length of time that the particular type of threat is present;
a consecutive number of frames that individual threats have been detected;
annotating the frame to create an annotated frame that includes the one or more threats and at least a portion of the details associated with individual threats of the one or more threats; and
sending a notification to a designated recipient, the notification including a link to view the annotated frame.

16. The one or more non-transitory computer-readable storage media of claim 15, wherein the posture associated with the person comprises at least one of:
holding both arms up,
holding both hands behind a person's head,
holding both hands behind a person's back,
crouching,
lying down,
push,
fist fight,
kick,
punch,
slap,
hackling,
shoving,
hands over a person's face,
hands over another person's body,
hands tied,
legs tied,
hiding behind an object,
crouching behind an object,
a presence of a person in an area that the person is not authorized to be present in,
bent over,
shaking,
trembling,
standing,
seating,
walking,
running,
snatching,
an injured posture, or
any combination thereof.

17. The one or more non-transitory computer-readable storage media of claim 15, wherein processing the frame to create the processed frame comprises:
adjusting a frame size of the frame;
adjusting a sharpness of the frame;
adjusting a zoom of the frame;
adjusting a brightness of the frame;
adjusting a contrast of the frame;
adjusting a color saturation of the frame;
adjusting one or more colors of the frame;
adjusting a resolution of the frame;
stitching one or more frames into a single frame
converting the one or more colors of the frame to a grayscale;
converting the frame into two or more portions of the frame; or
any combination thereof.

18. The one or more non-transitory computer-readable storage media of claim 15, wherein the facial expression indicates:
fear,
surprise,
anger,
aggression,
pain,
hurt,
distress,
aggravation,
being bullied, or
any combination thereof.

19. The one or more non-transitory computer-readable storage media of claim 15, wherein the details associated with individual threats include:
a locus comprising one of the person, or the object;
a threat type;
a threat level determined based at least in part on the facial expression of the person, a threatening gesture, or the weapon in the processed frame;
a length of time individual threats have been detected;
a consecutive number of frames that individual threats have been detected;
a probability associated with the threat type; or
any combination thereof.

20. The one or more non-transitory computer-readable storage media of claim 15, wherein the gesture comprises:
a first gesture that indicates a presence of a threat; or
a second gesture performed near a particular sign.

* * * * *